US008517902B2

(12) United States Patent
Kim et al.

(10) Patent No.: US 8,517,902 B2
(45) Date of Patent: Aug. 27, 2013

(54) ROLLER ASSEMBLY AND ROLLING APPARATUS OF COOKER COMPRISING THE SAME

(75) Inventors: Kyuyoung Kim, Changwon (KR); Jaemyung Chin, Changwon (KR); Donghan Kim, Changwon (KR); Siyoung Choi, Changwon (KR); Sungho Choi, Changwon (KR); Sangryul Lee, Changwon (KR)

(73) Assignee: LG Electronics Inc., Seoul (KR)

( * ) Notice: Subject to any disclaimer, the term of this patent is extended or adjusted under 35 U.S.C. 154(b) by 465 days.

(21) Appl. No.: 12/747,654

(22) PCT Filed: Dec. 15, 2008

(86) PCT No.: PCT/KR2008/007424

§ 371 (c)(1), (2), (4) Date: Sep. 16, 2010

(87) PCT Pub. No.: WO2009/078646

PCT Pub. Date: May 25, 2009

(65) Prior Publication Data

US 2011/0003671 A1 Jan. 6, 2011

(30) Foreign Application Priority Data

Dec. 14, 2007 (KR) ........................ 10-2007-0130728

(51) Int. Cl.
*B23P 17/00* (2006.01)

(52) U.S. Cl.
USPC .................................. 492/49; 492/15; 492/16

(58) Field of Classification Search
USPC ................. 492/49, 53, 40, 15, 47; 16/45, 46, 16/91
See application file for complete search history.

(56) References Cited

U.S. PATENT DOCUMENTS 5,493,777 A * 2/1996 Burke ........................ 29/895.32
2006/0143918 A1* 7/2006 Martin et al. ................ 29/895.2

FOREIGN PATENT DOCUMENTS

KR 20-2000-0008563 5/2000
KR 20-2000-0008563 U 5/2000
KR 10-2001-0057062 7/2001
KR 10-2004-0087640 10/2004

OTHER PUBLICATIONS

International Search Report issued in PCT/KR2008/007424 dated Jun. 30, 2009.
Korean Office Action dated Jun. 30, 2009 issued in Application No. 10-2007-0130728.

* cited by examiner

*Primary Examiner* — David Bryant
*Assistant Examiner* — Christopher Besler
(74) *Attorney, Agent, or Firm* — KED & Associates, LLP

(57) ABSTRACT

The present invention relates to a roller assembly and a rolling apparatus of a cooker including the roller assembly. In the present invention, an inner roller formed of ceramic material is coupled inside an outer roller formed of Teflon material. Thus, according to the present invention, while retaining a predetermined thermal resistivity and strength, roller assembly can be more easily fabricated.

14 Claims, 1 Drawing Sheet

ROLLER ASSEMBLY AND ROLLING APPARATUS OF COOKER COMPRISING THE SAME

TECHNICAL FIELD

The present invention relates to a cooker, and more particularly, to a roller assembly that rotates a tray that is installed in a cooker and a rolling apparatus of a cooker including the roller assembly.

BACKGROUND ART

A cooker is a household appliance that houses food within a cavity and heats to cook the housed food. The cooker heats food through electromagnetic wave heating in which electromagnetic waves are radiated from a magnetron, radiation heating employing radiated heat generated by a heater, convection heating employing hot currents, etc.

A cooker is provided with a turntable for uniformly heating food in its entirety. The turntable is rotatably installed within the cooker. Also, a roller assembly is provided in the cooker to rotate the turntable.

DISCLOSURE OF INVENTION

Technical Problem

An object of the present invention is to provide a roller assembly with improved durability, and a rolling apparatus of a cooker including the roller assembly.

Another object of the present invention is to provide a roller assembly with improved operational reliability, and a rolling apparatus of a cooker including the roller assembly.

Technical Solution

To achieve the above objects, embodiments of the present invention provide a roller assembly that rotates about a roller shaft, including: an outer roller contacting and rolling on a floor of a cavity; and an inner roller coupled to an inside of the outer roller, wherein the outer roller and the inner roller are formed of different materials.

Embodiments of the present invention also provide a rolling apparatus of a cooker, including: a turntable motor installed below a cavity and provided with a motor shaft; a rotating ring coupled to the motor shaft to rotate within the cavity, and including a plurality of roller shafts provided on an outer periphery thereof; and a roller assembly coupled to the roller shaft, and including an outer roller contacting and rolling on a floor of the cavity, and an inner roller coupled within the outer roller, wherein the outer roller and the inner roller are formed of different materials.

Advantageous Effects

The present invention has the advantages of improved workability, durability, and operational reliability.

MODE FOR THE INVENTION

Reference will now be made in detail to embodiments of a rolling apparatus of a cooker according to the present invention, examples of which are illustrated in the accompanying drawings. It should be understood, however, that the spirit and scope of the present invention are not limited to the embodiments provided herein, that those skilled in the art who understand the principles of the present invention will easily be able to devise other embodiments falling within the spirit and scope of the present invention, and that such embodiments will be deemed included in the present invention.

Figure 1:
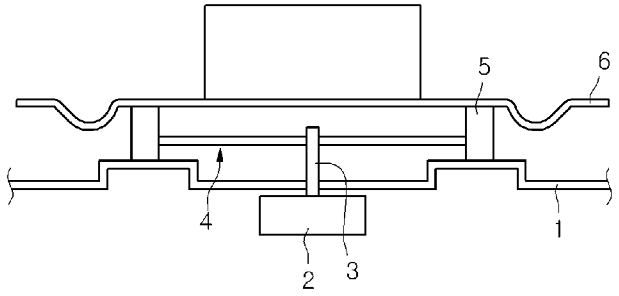
FIG. 1 is a schematic sectional view of a rolling apparatus of a cooker according to the present invention.
Figure 2:
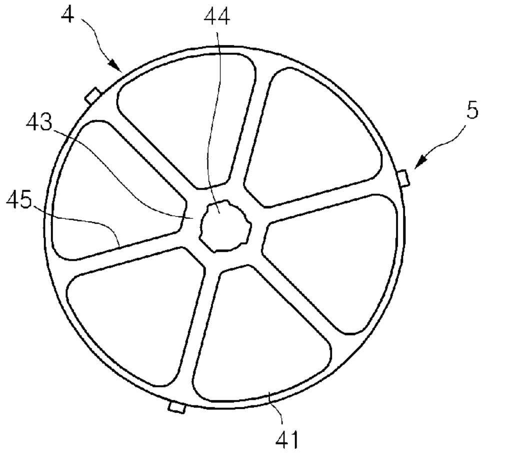
FIG. 2 is a plan view of a rotating ring according to embodiments of the present invention.
Figure 3:
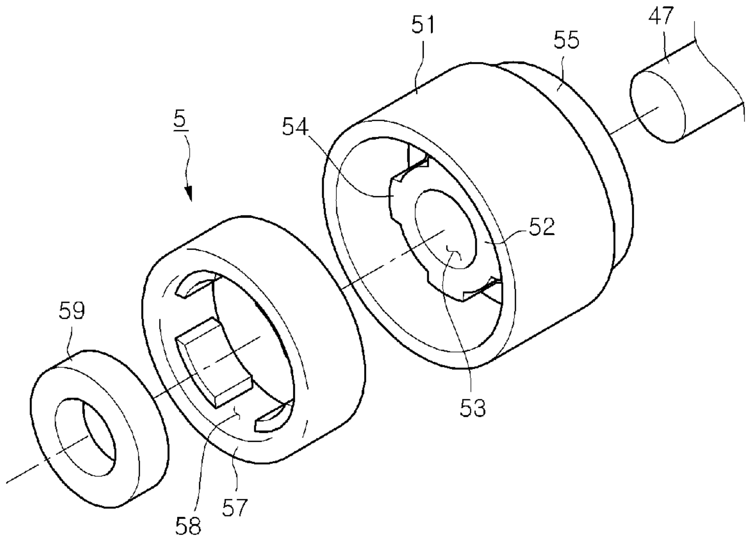
FIG. 3 is a perspective view of a roller assembly according to embodiments of the present invention.

FIG. 1 is a schematic sectional view of a rolling apparatus of a cooker according to the present invention, FIG. 2 is a plan view of a rotating ring according to embodiments of the present invention, and FIG. 3 is a perspective view of a roller assembly according to embodiments of the present invention.

First, with reference to FIG. 1, a turntable motor 2 is installed below a bottom plate 1 of a cavity. A motor shaft 3 is provided on the turntable motor 2. The motor shaft 3 extends upward from the turntable motor 2 through the bottom plate 1.

Also, a rotating ring 4 is coupled to the motor shaft 3. The rotating ring 4 is formed in an overall annular shape. A plurality of roller assemblies 50 is formed on the outer periphery of the rotating ring 4. The rollers 50 support the turntable 6 having food placed on its upper surface.

Referring to FIG. 2, the rotating ring 4 includes an annular ring portion 41, a shaft coupling core 43 to which the motor shaft 3 of the turntable motor 2 is coupled, and a plurality of supports 45 connecting the ring portion 41 and the shaft coupling core 43. The shaft coupling core 43 defines a shaft coupling opening 44 in which the motor shaft 3 is coupled. Also, the shaft coupling opening 44 may be formed in a non-circular shape provided continuously with projections and recesses, respectively, in order to transmit driving force of the motor shaft 3 when the motor shaft 3 is coupled thereto. Further, the roller assemblies 50 are installed on the outer periphery of the ring portion 41.

Referring to FIG. 3, a plurality of roller shafts 47 is provided on the outer periphery of the ring portion 41. The roller shafts 47 extend radially from points on the outer periphery of the ring portion 41 that are separated by preset central angles. For example, the roller shafts 47 may be coaxially disposed with the supports 45.

Additionally, the roller assembly 5 includes an outer roller 51, an inner roller 57, and a washer 59. The outer roller 51 and the inner roller 57 are formed of mutually different materials, and the washer 28 functions to firmly fix the roller shaft 47.

In further detail, the outer roller 51 is formed in a hollow cylindrical shape with one end open. A shaft coupling portion 52 is provided within the outer roller 51. The shaft coupling portion 52 is formed in a cylindrical shape with a smaller diameter than the inner diameter of the outer roller 51. Also, a shaft coupling hole 53 is defined through the shaft coupling portion 52. The shaft coupling hole 53 is defined through the outer roller 51 and the shaft coupling portion 52. The roller shaft 47 is coupled to the shaft coupling hole 53. In addition, a plurality of catch projections 54 is provided on the outer roller 51. The catch projections 54 are portions that engage with catch recesses 58 (to be described below) of the inner roller 57. The catch projections 54 extend radially from points on the outer periphery of the shaft coupling portion 52 that are separated by a preset central angle. With the roller assembly 5 coupled to the rotating ring 4, the outer peripheries of the outer rollers 51 respectively contact the floor 1 of the cavity and the undersurface 6 of the turntable 6. Thus, when the rotating ring 4 is rotated by means of the driving force of the turntable motor 2, the roller assemblies 5 move by rolling. Further, a stepped portion 55 is provided on the outer periphery of the outer roller 51. The stepped portion 55 is formed stepped so that a portion of the outer roller 51 is reduced in outer diameter. Accordingly, only a portion of the outer roller 51 (excluding the stepped portion 55) contacts the floor 1 of the cavity and the undersurface of the turntable 6. This is to ensure a predetermined coupling force between the outer roller 51 and the roller shaft 47, while minimizing heat transfer between the outer periphery of the outer roller 51 and the floor 1 of the cavity and the undersurface of the turntable 6. More specifically, in order for the roller assemblies 5 to rotate about the roller shaft 47, the length of the shaft coupling portion 47 in the extending direction of the roller shaft 47—that is, the length of the outer roller 51—must be at least a predetermined length. However, when the length of the outer roller 51 is extended, the physical contacting areas between the outer periphery of the outer roller 51 and the floor 1 of the cavity and the undersurface of the turntable 6 are increased. Accordingly, when heat for cooking food is provided inside the cavity, the amount of heat transferred through the floor 1 of the cavity to the outer roller 51 can increase. In present embodiments, by forming a portion of the outer periphery of the outer roller 51 stepped in a direction in which the outer diameter decreases, a predetermined coupling force can be maintained between the outer roller 51 and the roller shaft 47, while at the same time minimizing heat transfer between the outer periphery of the outer roller 51 and the floor 1 of the cavity and the undersurface of the turntable 6.

The inner roller 57 is formed in an annular shape with an outer diameter corresponding to the inner diameter of the outer roller 51, and an inner diameter corresponding to the outer diameter of the shaft coupling portion 52. The inner roller 57 is physically inserted inside the outer roller 51, or more particularly, inserted in the space between the inner periphery of the outer roller 51 and the outer periphery of the shaft coupling portion 52. Also, a plurality of catch recesses 58 is defined in the inner periphery of the inner roller 57. The catch recesses 58 are formed recessed radially in an inner peripheral portion of the inner roller 57 to correspond to the catch projections 54. Accordingly, when the inner rollers 57 are inserted in the outer rollers 51, the catch projections 54 are inserted in the catch recesses 58.

Also, the outer rollers 51 and the inner rollers 57, as described above, are formed of mutually different materials. For example, the outer rollers 51 may be formed of Teflon material, and the inner rollers 57 may be formed of ceramic material. This is for forming the outer rollers 51 (with a comparatively more complex shape) of Teflon to give them a predetermined thermal resistance while making their fabrication easy, and forming the inner rollers 57 of ceramic material with lower workability but high thermal resistance. Also, in the case of the outer rollers 51, because they physically contact the roller shafts 47, it is preferable to form them of Teflon, which has a lower friction coefficient than ceramic, given the same surface area.

The washer 59 is inserted over the end of the roller shaft 47 that is physically passed through the shaft coupling hole 53. The washer 59 is formed in an annular shape having an inner diameter smaller than the diameter of the roller shaft 47. Preferably, the inner diameter of the washer 59 may be designated to be smaller than the diameter of the roller shaft 47, and the washer 59 may be press-fitted over the end of the roller shaft 47. However, the outer diameter of the washer 59 may be designated to be smaller than the inner diameter of the outer roller 51.

Below, the function of the rolling apparatus of a cooker according to the present invention will be described in further detail.

First, when the turntable motor 2 operates, the motor shaft 3 is rotated, and the rotating ring 4 is rotated about the motor shaft 3. Also, through the rotation of the rotating ring 4, the roller shaft 47 revolves about the motor shaft 3.

However, as described above, the outer periphery of the roller assembly 5—or more specifically, the outer periphery of the outer roller 51—is in a state contacting the floor 1 of the cavity and the undersurface of the turntable 6. Accordingly, when the rotating ring 4 rotates and the roller shaft 47 revolves, the roller assembly 5 moves in a rolling motion.

Here, as described above, the surface area of the outer roller 51 that physically contacts the floor 1 of the cavity and the undersurface of the turntable 6 is minimized due to the stepped portion 55 that is stepped in a direction reducing its outer periphery. Thus, heat transfer through the floor 1 of the cavity can be minimized.

The outer roller 51 that contacts the floor 1 of the cavity and the undersurface of the turntable 6 is formed of Teflon material, as described above. Therefore, during revolving of the roller assembly 5, a smooth rolling motion can be achieved.

In addition, the inside of the cavity is heated to a high temperature to cook food placed on the top surface of the turntable 6. However, as described above, the outer roller 51 that contacts the floor 1 of the cavity is formed of Teflon material that has a predetermined thermal resistance, and the inner roller 57 is formed of ceramic material that has high heat resistance. Therefore, damage to the roller assembly 5—that is, the outer roller 51 and the inner roller 57—from high temperatures within the cavity can be reduced.

In addition, by inserting the inner roller 57 (formed of ceramic that has comparatively reduced workability but high strength) into the outer roller 51 (formed of Teflon that is easy to fabricate), easy fabrication and a predetermined amount of strength can be secured for the roller assembly 5. Accordingly, easy fabrication of the roller assembly 5 can be achieved while reducing damage from external shocks, etc.

Industrial Applicability

The roller assembly and cooker including the roller assembly configured as above in accordance with the present invention can have the following effects.

First, in the present invention, the outer roller and the inner roller are formed of Teflon material and ceramic material, respectively. Therefore, while retaining a predetermined thermal resistance and strength, the roller assembly can be more easily fabricated.

Also, in the present invention, as described above, because the thermal resistance and strength of the roller assembly are retained, the operation of the roller assembly—that is, the rolling movement of the roller assembly—can be more precisely implemented. Therefore, operational reliability of the turntable (supported by the roller assembly) can be improved.

Furthermore, in the present invention, by forming a portion of the outer periphery of the outer roller to have a reduced outer diameter, the surface area contacting the floor of the cavity and the undersurface of the turntable can be reduced. Thus, heat transfer by the roller assembly can be reduced, and physical durability of the roller assembly can be improved.

The invention claimed is:

1. A rolling apparatus of a cooker, comprising:

a turntable motor installed below a cavity and provided with a motor shaft;

a rotating ring coupled to the motor shaft to rotate within the cavity;

a plurality of roller shafts provided on an outer periphery thereof;

an outer roller provided with a shaft coupling portion, the outer roller having an outer radial wall that defines a hollow cylindrical cavity with an open end, the shaft coupling portion being disposed within the cavity; and an inner roller coupled within the cavity of the outer roller, wherein an outer periphery of the shaft coupling portion is coupled to the inner roller, and an inner periphery of the shaft coupling portion is coupled to the roller shaft.

2. The roller apparatus according to claim 1, wherein the inner roller is formed of a material comparatively stronger than that of the outer roller.

3. The roller apparatus according to claim 1, wherein the outer roller is formed of a TEFLON® material, and the inner roller is formed of a ceramic material.

4. The roller apparatus according to claim 1, further comprising a catch that rolls the inner roller in connection with the rolling of the outer roller.

5. The roller apparatus according to claim 4, wherein the catch comprises:

at least one catch projection provided on one side of one of the outer roller and the inner roller; and at least one catch recess provided on an opposite side of the other of the outer roller and the inner roller, the catch projection being inserted in the catch recess.

6. The roller apparatus according to claim 1, wherein the outer roller and the inner roller are formed of different materials.

7. The roller apparatus according to claim 1, wherein the outer roller comprises a stepped portion defined on an outer periphery thereof, wherein the stepped portion is stepped in a direction to the roller shaft from the outer periphery thereof.

8. The roller apparatus according to claim 7, wherein the stepped portion is defined in a portion of the outer periphery of the outer roller, stepped in a direction in which an outer diameter thereof is reduced.

9. A rolling apparatus of a cooker, comprising:

a turntable motor installed below a cavity and provided with a motor shaft;

a rotating ring coupled to the motor shaft to rotate within the cavity, and comprising a plurality of roller shafts provided on an outer periphery thereof; and a roller assembly coupled to each roller shaft, and comprising an outer roller that contacts and rolls on a floor of the cavity, and an inner roller coupled within the outer roller, and a stepped portion defined on an outer periphery of the outer roller that reduces a surface area of the outer roller, wherein the outer roller is formed in a hollow cylindrical shape with one end open, and the inner roller is formed in an annular shape with an outer diameter corresponding to an inner diameter of the outer roller, and wherein the roller shaft is passed through an inside of the outer roller and the stepped portion is stepped in a direction to the roller shaft from the outer periphery thereof.

10. The rolling apparatus according to claim 9, wherein the outer roller is formed of a TEFLON® material, and the inner roller is formed of a ceramic material.

11. The rolling apparatus according to claim 9, wherein at least one catch projection is provided on a side of one of the outer roller and the inner roller, at least one catch recess is defined in an opposite side of the other of the outer roller and the inner roller, the catch projection being inserted in the catch recess to roll the inner roller in connection with the rolling of the outer roller.

12. The rolling apparatus according to claim 9, wherein the outer roller comprises a shaft coupling portion therein, the shaft coupling portion having an outer diameter corresponding to an inner diameter of the inner roller and defining a shaft through-hole through which the roller shaft passes.

13. The rolling apparatus according to claim 9, wherein the outer roller and the inner roller are formed of different materials.

14. The rolling apparatus according to claim 9, wherein the stepped portion is stepped in a direction in which an outer diameter thereof is reduced.

* * * * *